Figure 4:
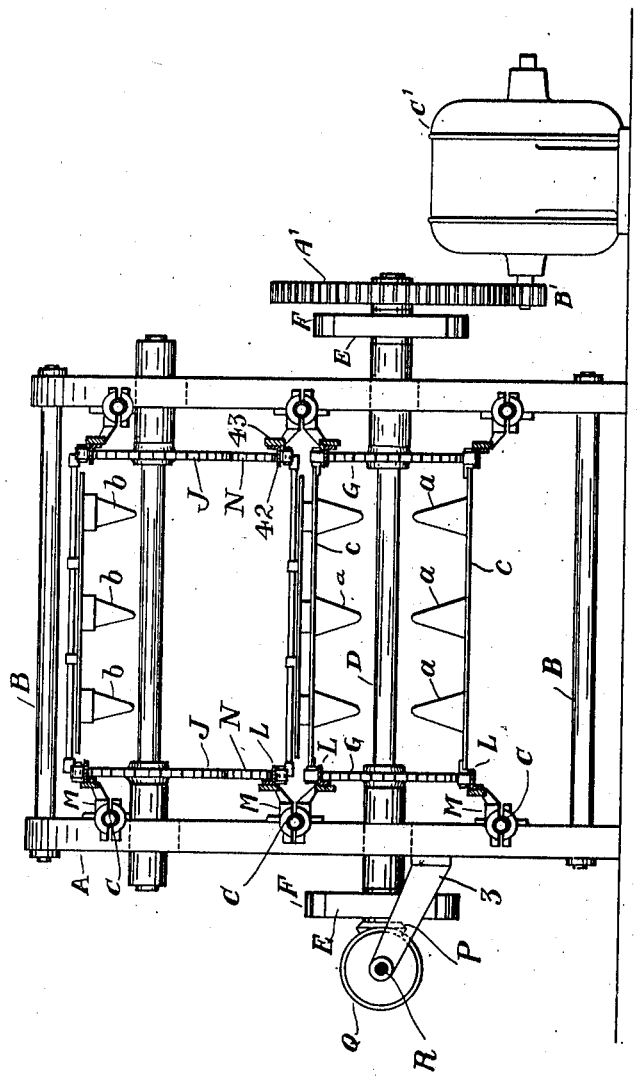

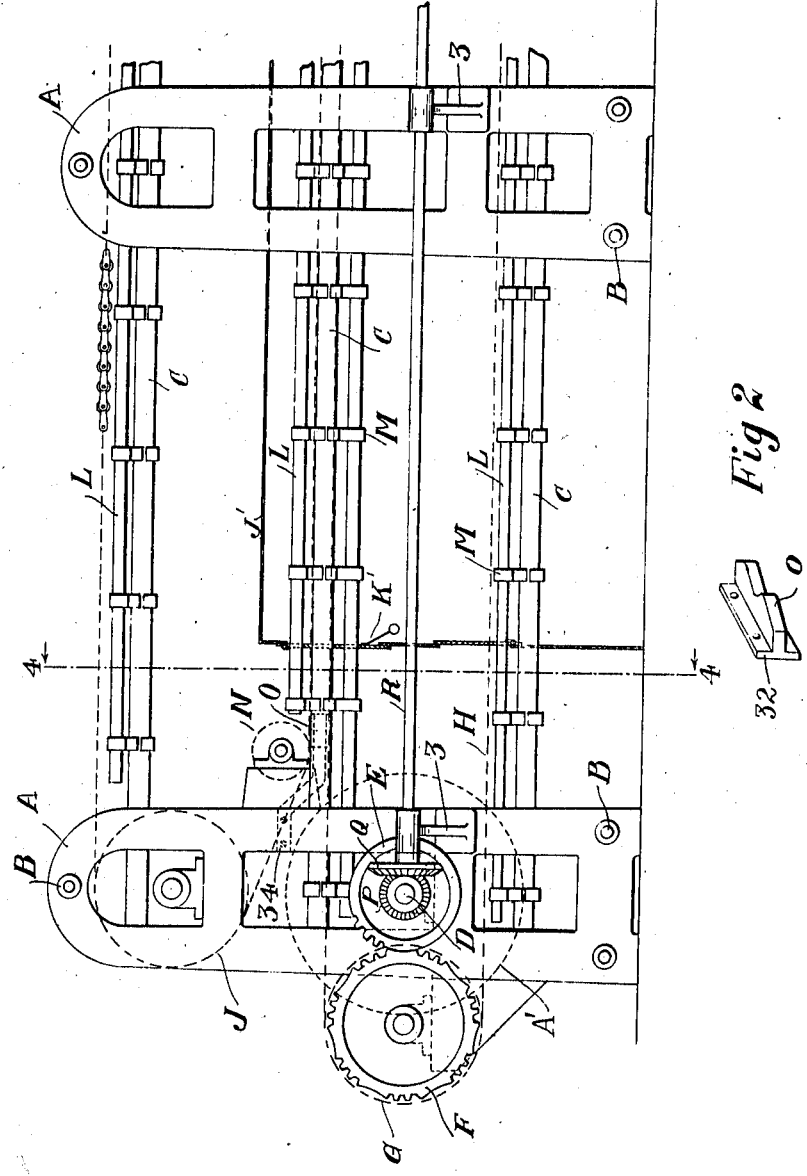

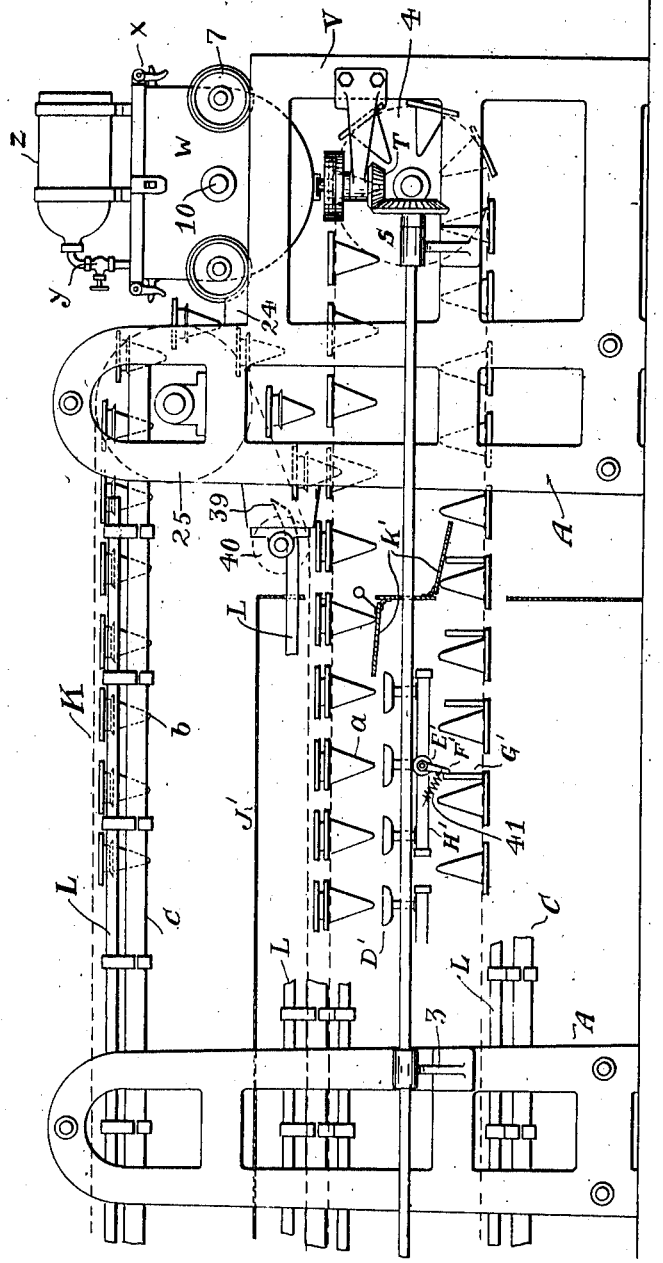

J. W. WEIL.
MOLDING MACHINE.
APPLICATION FILED JAN. 21, 1910.

988,919.

Patented Apr. 4, 1911.
5 SHEETS—SHEET 3.

Witnesses
Victor E. Jullien
David J. Walsh

Inventor
Joseph Warren Weil
Attorney

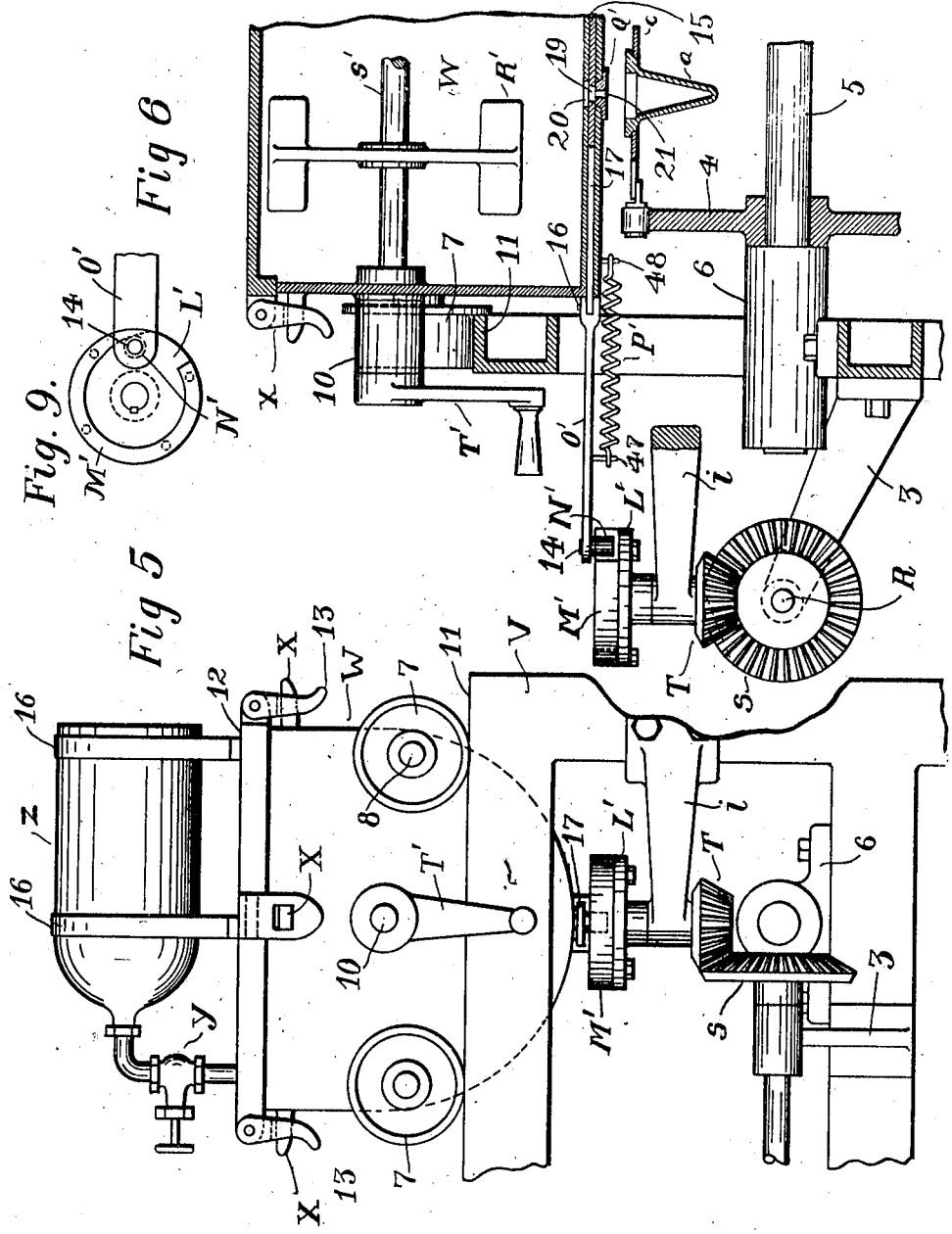

J. W. WEIL.
MOLDING MACHINE.
APPLICATION FILED JAN. 21, 1910.

988,919.

Patented Apr. 4, 1911.
5 SHEETS—SHEET 5.

Witnesses
Victor E Jullien
David J Halsh

Inventor
Joseph Warren Weil
Attorney

UNITED STATES PATENT OFFICE.

JOSEPH WARREN WEIL, OF CINCINNATI, OHIO.

MOLDING-MACHINE.

988,919.  Specification of Letters Patent.  Patented Apr. 4, 1911.

Application filed January 21, 1910. Serial No. 539,236.

*To all whom it may concern:*

Be it known that I, JOSEPH WARREN WEIL, a citizen of the United States, whose residence is Cincinnati, Ohio, have invented a certain new and useful Improvement in Molding-Machines, of which the following is a specification.

My invention relates to a means for molding and treating material.

It more particularly relates to the apparatus that is used in the formation and baking and delivery of the material.

For the purpose of illustrating one form or embodiment of my invention I have shown and described an apparatus used in the manufacture of ice cream cones.

The invention is applicable to many ends and the apparatus selected is merely illustrative and by making alterations the apparatus may be used to manufacture many other molded articles. A means is provided for filling the molds and for carrying them through the parts of the apparatus while the molds and material are treated and for finally delivering the molded material.

The invention is contained in structural embodiments which have features that are described or suggested in the following description and illustrated in the drawings and any modifications thereof which are covered by the claims.

Figure 7:
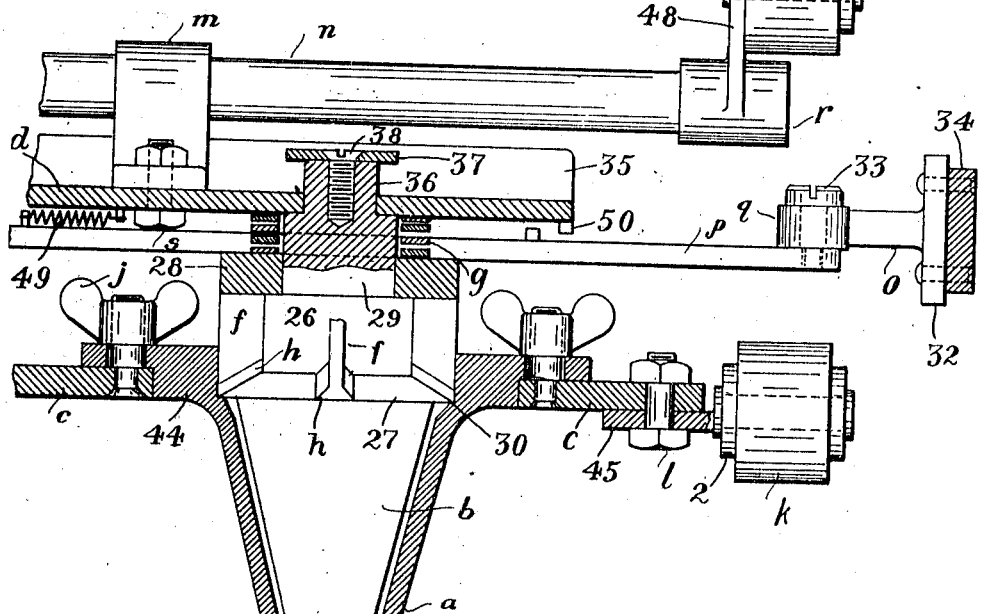
Figure 8:
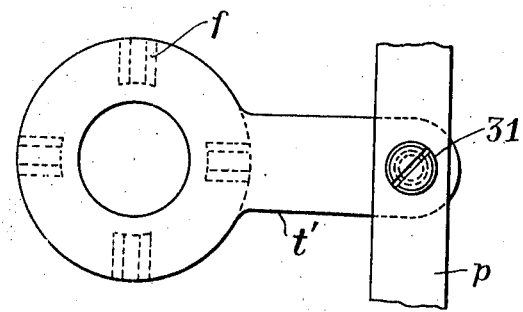

Referring to the drawings, Figure 1 is a side view of one end of the apparatus. Fig. 2 is a view of a detail. Fig. 3 is a side view of another end of the apparatus. Fig. 4 is a sectional view looking toward one end. Fig. 5 is a side view of the dough delivering mechanism and Fig. 6 is a sectional end view of the same. Fig. 7 illustrates a sectional view of the molding apparatus. Fig. 8 illustrates a detail also partly shown in Fig. 7. Fig. 9 is an illustration of a detail also shown in Figs. 5 and 6.

Referring to Figs. 1 and 3, A are stanchions for supporting the apparatus. The stanchions are connected together by tie-rods B in the manner well known. C are longitudinal pipes which connect the parts and with A and B make up the supporting framework of the apparatus. The power for operating the apparatus is applied to the shaft D. Any desired motor may be used to operate the apparatus. For purposes of illustration I have shown an electric motor C' having the pinion B' which operates upon the cog-wheel A'. The cog-wheel A' is keyed to the shaft D and causes the rotation of the two Geneva gears E, F and the beveled gear P. The gear E operates upon the gear F but one-eighth of the time, causing a step-by-step rotation of the gear F. The two gears F are secured to the same shaft and coöperate to cause the rotation of the two chain gears G. The chain gears G operate the two chains H. The chains carry the molds from one part of the apparatus to the other from the place of charging the molds to the place of delivery of the articles molded. The chains move upon the rails L which extend from one end of the apparatus to the other. The chains are provided with rollers K (Fig. 7) which run upon the tracks. The tracks are angle irons 42 which are attached to strips of iron 43. They are supported by brackets M which are clamped to the pipes C. The molds are attached to plates which are secured to the chains and as the chains move from one end of the apparatus to the other the molds and plates are carried back and forth belt-wise. The molds are supported in the plates $c$. The plates extend across from one chain belt to the other as shown in Fig. 4. The weight of the plates and the molds is carried by the rollers $k$ as shown in Fig. 7. The plates $c$ are provided with holes which are adapted to receive the molds $a$. The molds may be of any shape whatsoever and they may be made of any suitable material. They are provided with a flange 44 which varies in its width according to the size of the mold. A number of sizes of molds may thus be inserted in the machine to produce different sizes of the articles molded. The molds are secured to the plates $c$ by thumb-screw bolts. The molds are readily removed by turning the thumb-screws $j$ and lifting the molds from the plates. The plates $c$ are attached to the inner links 2 by means of the laterally extending flange 45. The bolt 1 secures the two together. The link 2 binds two adjoining rollers $k$ together. The rollers form a means of bearing adapted to receive the weight of the plates and molds as well as the chains. When the molds are inserted in the plates they extend inward with reference to the chain belt so that the upper molds open upward and as the chains carry the molds around the gears G the molds are turned upside down so that the molded pattern or material may be removed or dropped out at the delivering end of the apparatus.

The gear and chains carry the molds to and away from the receptacle which contains the material that is to be molded. In the form of apparatus illustrated I have shown a dough trough or receptacle from which dough is ejected automatically. This is best shown in Figs. 5 and 6. The dough trough W may be supported on wheels 7 which rotate on trunnions 8 and move on tracks 11. It may be made of any shape, but it is preferably made of such a shape that the material will readily flow therefrom into the molds, such as conical or cylindrical or the usual pyramidal or hopper shape. I have shown a semi-cylindrical trough. It is provided with a cover 12 having latches 13 which may be forced or snapped over the lugs X. If it is desired for the purpose of ejection of the material, pressure may be applied to the interior of the trough and to the surface of the material. This will cause it to respond promptly to any apparatus that may open ports to allow the removal of the material. It will cause the material to be forced from the trough. Any form of pressure device may be used such as air pump or a cylinder charged with air or other gas. I have shown a reservoir Z mounted on the cover 12 by means of the straps or yokes 16. A pipe having a valve Y connects the interior of the trough with the reservoir. When it is desired to apply pressure to the interior of the trough the valve Y is opened. Trunnions 10 may also be provided for handling the trough by crane or otherwise. I have also shown a shaft s' which supports paddles R' which extend through the trunnions 10 and has on one end thereof a handle T' for turning the shaft and causing the paddles to rotate. The trough may thus be used for a mixing trough and if desired be permanently secured to the framework of the apparatus.

An automatic means is preferably provided for opening and closing the ports of the trough for permitting the removal of the material in the charging of the molds. In order to accomplish this the beveled gear P shown in Fig. 1 operates upon the beveled gear Q. The beveled gear Q is keyed to the rod R which extends the length of the apparatus and to a point near the dough trough. The rod is supported by means of brackets 3 which are attached to the stanchions A. A gear S is attached to the end of the rod R which is near the dough trough. This gear operates upon the gear T which is supported in a bearing attached to the bracket i. The bracket is secured to the supporting framework V. A plate L' is connected to the gear T and is movable therewith. Rotation of the gear causes rotation of the plate. A cam M' is bolted to the plate L'. The cam M' is of the shell variety and hooks behind the roller N', which is attached to the shutter mechanism for opening the ports of the trough. The rotation of the cam draws the roller N' across the plate L' or a part of it and at the proper moment and for a definite period of time releases the roller N'. The shutter is open when the rod O' is drawn over by the cam. The period of time relative to the rotation of the gear is adjusted by securing the cam in different positions on the plate L'. The ports are in closed position while the molds are in motion by the operation of the Geneva gear E and F and the ports are opened and closed while the molds are at a standstill and before they start moving.

The roller N' is secured to a rod O' by means of the pin 14. The rod O' is hinged at 16 and is connected to the balance of the rod like a jack knife blade to a handle. A spring P' is attached to pins 47 and 48 located one on the rod O' and the other on the trough. They are located in a line back of the pivot 16 so that the alinement of the spring is to one side of the alinement of the center of the jointed rod O' and behind the pin 16. The cam M' upon rotation frictionally tends to push the outer end of the rod in the same direction as it is pulled by the spring P', but such movement being prevented by the abutting of the ends and back edges of the two parts of jointed rod and on the spring side. The rod moves back and forth in a channel 17 located on the bottom of the trough and carries a plate 15. The trough is provided with the ports 20. The plate is provided with the ports 19 and the channel is provided with the ports 21. The openings in the channel are screw-threaded and plugs Q' having openings of any desired size may be inserted in the openings of the channel so that proper amounts of the material may be ejected upon each operation of the plate 15. A second set of molds is provided which coöperate with the first set of molds. In this particular illustration of my invention the interior of the cones are molded. It is of course understood that different forms of coöperating molds may be used to produce the desired product. In the production of the ice cream cones, I have provided a set of male molds which are inserted into the female molds after they are charged. The molds are then carried forward and passed through an oven and finally separate at the opposite end of the apparatus where the molded articles are delivered.

After small quantities of the dough are inserted in the molds and they are carried forward and from beneath the trough W the molds b are carried down by suitable mechanism and inserted into the molds $a$. They are then forced into the dough which is pressed up and into the space between the molds partaking of the configuration of the interior of one set of molds and the exterior of the other set of molds. The molds $b$ are carried by two endless chains K. The chains are also provided with roller bearings. The upper part of each chain belt moves on the top of the upper track but the lower part moves along the underside of the lower track L. The chains move over the gears J and 25 and they are guided by the gears N and 40. Motion of one set of molds causes the other set to move. The molds $b$ (Fig. 7) set tightly on shoulders 30 and in the throat of the female mold.

The molds when fitted together, form a means for connecting the two sets of molds, chains and operating mechanism. In the form of apparatus shown the molds $b$ are solid cones and extend down into the interior of the molds $a$ leaving a small space between the surfaces of the molds. The molds $b$ are each provided with a neck 26 and a shoulder 27 which is mushroom shape and forms a piston. Its outer edge sets into the shoulder 30 of the mold $a$. The shoulder while it does not tightly fit the throat of the mold $a$, operates to force the material in to all parts of the space between the molds. A ring 28 is located above the neck 26 and movable about the head 29. The ring 28 carries knives $f$ which extend downward along the neck 26 and rests upon the shoulders or pistons 27 and extend from the neck 26 to the throat of the mold $a$. The space between the throat of one mold and the neck of the other will hold any overflow of the material. The knives $f$ are double-edged, having feet which extend laterally. They are adapted to cut the edge of the molded pattern and clean the piston 27 of any over-flow. The ring 28 is provided with an arm $t'$. (See Fig. 8). A rod $p$ is pivotally connected to the arms $t'$ of the molds of each plate, by means of the screws 31. A spring 49 is connected to the plate and to the rod. The movement of the rod is limited by a suitable stop. A roller $q$ is attached to the rod $p$ and is adapted to be operated upon by the cam O, shown in Fig. 2, which is attached to an arm 34 mounted on the stanchion at the delivering end of the apparatus. The cam O is supported in the path of movement of the roller $q$ as the molds are carried forward by the chain and just before the molds reach the gear N the cam O causes the rings 28 to rotate back and forth a sufficient distance so that the knives $f$ swing around the neck 26 and on the pistons 27. They move over the entire length of the piston and completely scrape off the surplus of the material left on the shoulder as well as trim the edge in this particular case of the cone. The separated particles drop off the sloping piston 27, upon the separation of the two molds at the delivering end of the machine.

The molds $b$ are supported by a plate $d$. The head 29 has a reduced portion 36 which extends upward through an opening in the plates $d$. A washer 37 is secured by a screw 38 to the top of the head and prevents the molds from dropping entirely through the hole in the plate. A spring $g$ pushes the mold downward and elastically forces the molds $b$ into the molds $a$ when the two molds are brought together. The plate $d$ is provided with a reinforcing flange 35. It is suspended by a yoke $m$ which is attached to the plate by the bolts $s$. A rod $n$ passes through the yoke $m$ and is pivoted in the bearing $r$ so that the molds $b$ swing freely in a vertical position which they maintain throughout the circuit of their movement. The bearing $r$ is supported on a plate 48 attached to a pair of rollers $o$. As described before the rollers $o$ move along the angle irons of the tracks L.

When the molds $b$ are carried down by the gear 25 and gear 40 the rollers $o$ pass underneath the track L which is at that end slightly inclined upward. As the chains are drawn onward the rollers $o$ and the plates $d$ are forced downward thus forcing the molds $b$ into the molds $a$ and pressing the dough or other material up and around the surfaces of the two molds, this pressure being regulated to a certain extent by the spring $g$ which comes into play immediately upon the insertion of the mold $b$ into the material. The mold is pushed down until the toad-stool shoulder enters the throat of the mold $a$ and presses the material into all parts of the space between the molds. It is then pushed down until it finally rests upon the shoulder the shoulder 27 finally rests upon the shoulder 30. The molds are then carried forward a short distance when another set of female molds receives a small amount of the material, and at the same time a plate of molds of each set match and so on step-by-step the molds are filled and the articles delivered from the apparatus.

In the apparatus that I have illustrated an oven J' is located between the gear wheels N and 40. The oven shown extends practically from one gear wheel to the other. The oven is of the usual construction, and requires no special description. The oven is provided with the doors K' which are weighted or spring-operated to cause the doors to be closed automatically after they are opened and have allowed the plates of molds to enter. The doors are opened by the pressure of the molds against them as the molds are moved by the chain gear and the doors are subsequently closed by dropping behind or rising behind the molds as the case may be. Revolving doors may also be used to allow the plates to enter on one side and to pass out on the other.

The oven may be heated by gas if desired and in that case a means may be provided for opening and practically closing the gas valve while the doors are open. This is for the purpose of economy and if desired only the gas jets located at the ends of the oven may thus be operated upon. In order to accomplish this rods G' shown in Fig. 3, may be attached to the plates carrying the female molds and extend upward so as to strike the arm F' which is attached to the valve E'. As the molds are moved outward the doors are opened and the arm G' turns the arm F' thus closing off the gas. When the molds have moved a sufficient distance to clear the doors the arm F' springs back by the operation of the spring 41 and the gas valve is opened.

What I have described above is merely one of the embodiments of my invention. I have not attempted to describe all the forms of the apparatus to which the invention may be applied. The elemental features of the invention may be varied according to the purpose for which the apparatus is intended and the construction may be varied by those skilled in the art without in any way departing from the spirit of the invention.

What I claim is new and desire to secure by Letters Patent is as follows:—

1. In a baking apparatus the combination of a pair of coöperating molds, a trimming knife supported on one of the said molds and a cam for operating the said trimming knife.

2. In a baking apparatus the combination of a plurality of molds, trimming knives located on the said molds, means for moving the said molds and a cam for causing the said knives to operate.

3. In a baking apparatus the combination of a pair of coöperating molds, one of said molds having a piston, the other of said molds having a throat adapted to receive said piston, a trimming knife and means for causing the said knife to operate around the edge of the said piston.

4. In a baking apparatus the combination of a trough having ports, means for applying pressure to the interior of the said trough, a cam for opening the said ports, a plurality of molds charged by the said trough, a Geneva gear and a belt for operating the said molds step-by-step.

5. In a baking apparatus the combination of two sets of coöperating molds, each set connected together by an endless belt, means for causing one set to be operated by the other set, an automatic device for feeding the molds step by step, means for forcing elastically one set of molds against the other set of molds, an oven for operating upon the material fed to the mold, one set of molds being provided with knives, a cam, a cam bearing connected to the said knives adapted to be operated upon by the said cam.

6. In a baking apparatus the combination of a plurality of sets of molds, trimming knives adapted to move about the edges of the said molds, means for connecting the said trimming knives of each set of molds together and automatic means for operating the trimming knives of each set of molds.

7. In a baking apparatus the combination of a plurality of molds, means for moving the molds step by step, a container adapted to feed material into the said molds, an oven adapted to receive the said molds, a trimming knife adapted to move around the edge of each mold, means for automatically operating the said trimming knife on removal of the molds from the said oven.

8. In a baking apparatus the combination of a plurality of frames, a plurality of removable molds located in each of the said frames, tracks for supporting the said molds and said frames, a belt connected to the said frames, an automatic means for intermittently feeding material into the said molds, a second set of coöperating molds and frames, a belt for connecting the said second set of frames together, tracks for supporting the said second set of molds and for forcing the said second set of molds into the first set of molds, an oven located in the path of the said molds when in molding position, the said molds adapted to enter the said oven step-by-step, doors automatically operated by the said molds intermittently as they enter and leave the oven.

9. In a baking apparatus the combination of a plurality of frames, a plurality of removable molds located in each of the said frames, tracks for supporting the said molds and said frames, a belt connected to the said frames, an automatic means for intermittently feeding material into the said molds, a second set of coöperating molds and frames, a belt for connecting the said second set of frames together, tracks for supporting the said second set of molds and for forcing the said second set of molds into the first set of molds, an oven located in the path of the said molds when in molding position, the said molds adapted to enter the said oven step-by-step, doors automatically operated by the said molds intermittently as they enter and leave the oven, means for heating the said oven and means controlled by the first named set of molds for controlling the said heating means.

10. In a baking apparatus the combination of a plurality of frames, a plurality of removable molds located in each of the said frames, tracks for supporting the said molds and said frames, a belt connected to the said frames, an automatic means for intermittently feeding material into the said molds, a second set of coöperating molds and frames, a belt for connecting the said second set of frames together, tracks for supporting the said second set of molds and for forcing the said second set of molds into the first set of molds, an oven located in the path of the said molds when in molding position, the said molds adapted to enter the said oven step-by-step, doors automatically operated by the said molds intermittently as they enter and leave the oven, the said first named set of frames and molds adapted to be inverted by the operation of the said belt, the second set of frames and molds pivoted to the said second named belt and adapted to close and leave the first named set of frames and molds vertically relative to the movement of the first named set of molds.

In testimony whereof I have signed my name to this specification in the presence of two subscribing witnesses.

JOSEPH WARREN WEIL.

Witnesses:
F. F. CRAMPTON,
M. A. BUTLER.